V. S. CULWELL AND O. A. BIBB.
FLOAT CONTROLLED OIL GAGE.
APPLICATION FILED DEC. 21, 1920.
1,401,140.
Patented Dec. 27, 1921.
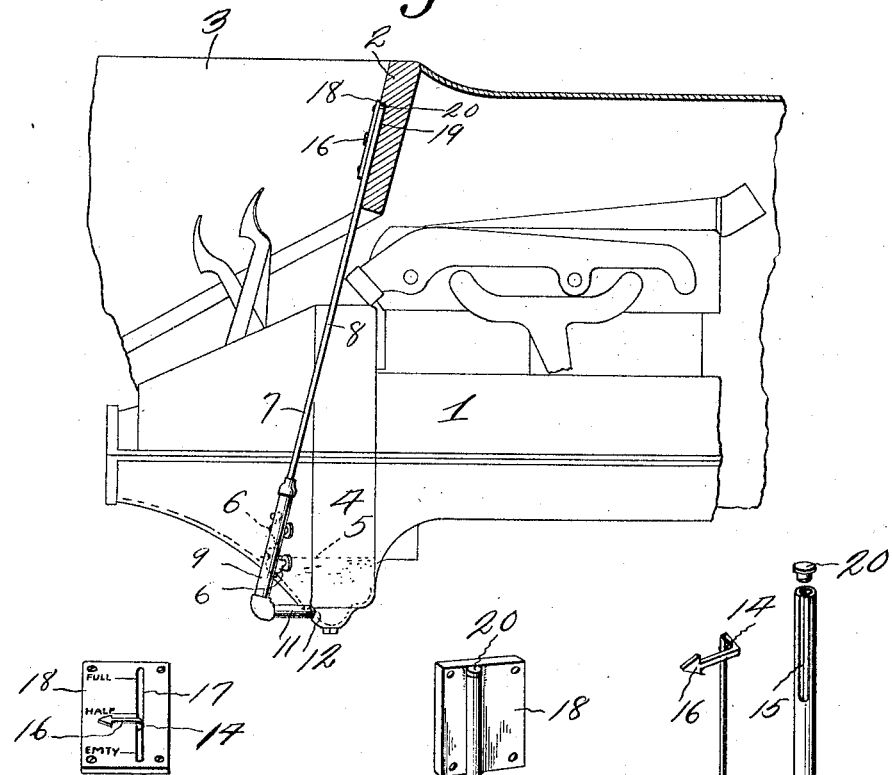
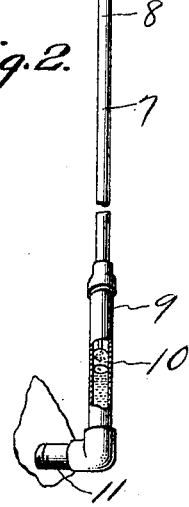
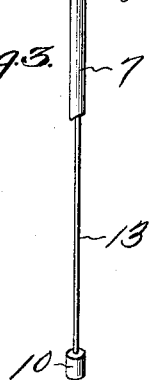
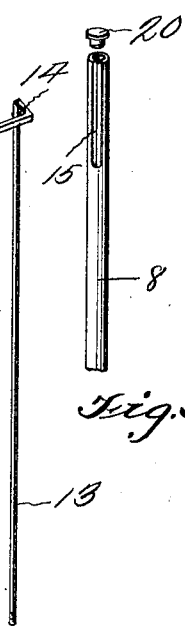
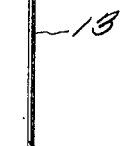
Inventors
V. S. Culwell
and O. A. Bibb
By D. Swift
their Attorney

UNITED STATES PATENT OFFICE.

VINSON S. CULWELL AND OTIS A. BIBB, OF WARRIOR, ALABAMA.

FLOAT-CONTROLLED OIL-GAGE.

1,401,140.      Specification of Letters Patent.      Patented Dec. 27, 1921.

Application filed December 21, 1920. Serial No. 432,215.

*To all whom it may concern:*

Be it known that we, VINSON S. CULWELL and OTIS A. BIBB, citizens of the United States, residing at Warrior, in the county of Jefferson, State of Alabama, have invented a new and useful Float-Controlled Oil-Gage; and we do hereby declare the following to be a full, clear, and exact description of the invention, such as will enable others skilled in the art to which it appertains to make and use the same.

The invention relates to float controlled oil gages and has for its object to provide a device of this character particularly adapted for use in connection with internal combustion engines of automobiles and to provide a gage so constructed that the amount of oil within the transmission casing of the engine will be indicated on the instrument board of the body of the automobile, and can be observed at all times by the operator of the automobile.

A further object is to provide a float controlled oil gage for internal combustion engines, comprising a tubular member connected to the transmission casing and extending upwardly and terminating adjacent the instrument board of the body of the automobile, said tubular member having a float disposed therein, which float has extending upwardly therefrom a rod which terminates in an angle indicator pointer vertically movable in a slot of the tubular member and coöperating with a scale carried by the instrument board.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a side elevation of a conventional form of automobile engine and a portion of the automobile body in section, showing the oil gage applied thereto.

Fig. 2 is a front elevation of the device.

Fig. 3 is a rear perspective view of the device, showing the lower part of the tube broken away.

Fig. 4 is a perspective view of the indicator rod and its pointer.

Fig. 5 is a detail perspective view of the upper end of the tubular member.

Referring to the drawings; the numeral 1 designates a conventional form of internal combustion engine of an automobile and 2 an instrument board of the automobile body 3. The transmission casing 4 is maintained full of oil 5, which oil, to properly lubricate the parts within the casing, must be maintained at a certain level. Practice at present is to provide the transmission casing with pet cocks 6, however to ascertain the level of the oil, the operator has to get out of the machine, crawl under the automobile and test the level of the oil within the transmission casing by opening the pet cocks 6. This operation is not only an inconvenient one but it is an extremely dirty one. To obviate this difficulty a float controlled oil gage 7 is provided, which gage comprises a substantially vertically disposed tubular member 8 having an enlarged lower end 9 forming a chamber in which the cylindrical shaped float 10 is disposed. The lower end of the enlarged portion 9 of the tubular member terminates in a right angled portion 11, which is tapped into the transmission casing 4 as at 12, thereby allowing the oil within the enlarged portion 9 of the tubular member to assume substantially the same level as the oil within the transmission casing 4, thereby allowing the levels to coincide in their fluctuations incident to consumption of oil and consequently causing an upward and downward movement of the float 10. Extending upwardly from the float 10 and through the reduced portions 8 of the tubular member is a rod 13, the upper end of which is bent outwardly so as to form a right angled portion 14, which passes through the vertical slot in the front face of the upper end of the tubular member 8. The indicator pointer 16 being formed at a right angle to the right angle portion 14 of the rod 13 and extends through a slot 17 in a scaled plate 18, which plate is secured to the instrument board 2. A scale is provided on the plate 18 and preferably indicates a full, a half or empty condition of the lubricant within the transmission casing 4, thereby allowing the operator to at all times observe and ascertain the amount of lubricant within the transmission casing. The upper end of the tubular member 8 is preferably disposed in a groove 19 of the instrument board and has its upper end closed by a threaded cap 20, which cap when removed and after the plate 18 has been removed allows access to the tubular member for cleaning purposes and also allows the rod 13 to be removed and the device disassembled.

The invention having been set forth what is claimed as new and useful is:—

The combination with a casing of an automobile engine and an instrument board of an automobile body located above said engine, of a float controlled oil level indicating gage carried by said engine casing, said gage comprising a tubular casing having its upper end disposed in a recess of the instrument board and its lower end in communication with the interior of the engine casing, the lower portion of the tubular member being enlarged thereby forming an oil chamber, a float disposed within said oil chamber, a rod carried by said float and extending upwardly through the tubular member and outwardly through a slot at its upper end, a cap for closing the upper end of the tubular member, a scale plate secured to the instrument board and provided with a slot registering substantially with the slot in the upper end of the tubular member, the upper end of said float carried rod being bent and extending through the slot in the scale plate at substantially a right angle and terminating in a pointer for coöperating with the scale on said scale plate, said pointer being formed integral with the rod and disposed at a right angle to and in the same plane as the portion of the rod extending through the slot in the plate.

In testimony whereof we have signed our names to this specification in the presence of two subscribing witnesses.

VINSON S. CULWELL.
OTIS A. BIBB.

Witnesses:
WILLIAM A. BROWN,
T. W. STREET, Jr.